United States Patent [19]

Renault et al.

[11] 4,048,293

[45] Sept. 13, 1977

[54] PROCESS FOR PURIFYING A SULFUR DIOXIDE CONTAINING GAS

[75] Inventors: Philippe Renault; André Deschamps, both of Noisy le Roi; Sigismond Franckowiak, Rueil Malmaison; Claude Dezael, Maisons Laffitte, all of France

[73] Assignee: Institut Francais du Petrole, Rueil-Malmaison, France

[21] Appl. No.: 671,711

[22] Filed: Mar. 29, 1976

[30] Foreign Application Priority Data

Apr. 11, 1975 France .................................. 75.11592

[51] Int. Cl.² ............................................. C01B 17/04
[52] U.S. Cl. .................................. 423/574 L; 423/242
[58] Field of Search ................................ 423/573–576, 423/242

[56] References Cited

U.S. PATENT DOCUMENTS

| 2,083,894 | 6/1937 | Connolly | 423/573 |
| 3,839,549 | 10/1974 | Deschamps et al. | 423/575 |
| 3,875,295 | 4/1975 | Barthel et al. | 423/575 |
| 3,882,222 | 5/1975 | Deschamps et al. | 423/575 |
| 3,883,638 | 5/1975 | Renault et al. | 423/574 |
| 3,895,101 | 7/1975 | Tsuruta | 423/574 |
| 3,896,215 | 7/1975 | Bratzler et al. | 423/574 |

*Primary Examiner*—G. O. Peters
*Attorney, Agent, or Firm*—Millen & White

[57] ABSTRACT

This process for purifying a sulfur dioxide containing gas, for example stack gas, comprises the steps of washing the gas with aqueous ammonia or ammonium sulfite, vaporizing sulfur dioxide and ammonia therefrom, reacting vaporized sulfur dioxide with hydrogen sulfide and recycling an ammonia containing stream. To avoid the drawbacks resulting from the presence of hydrogen sulfide in the recycle stream, a further oxidation step is provided to convert hydrogen sulfide to sulfur dioxide.

17 Claims, 1 Drawing Figure

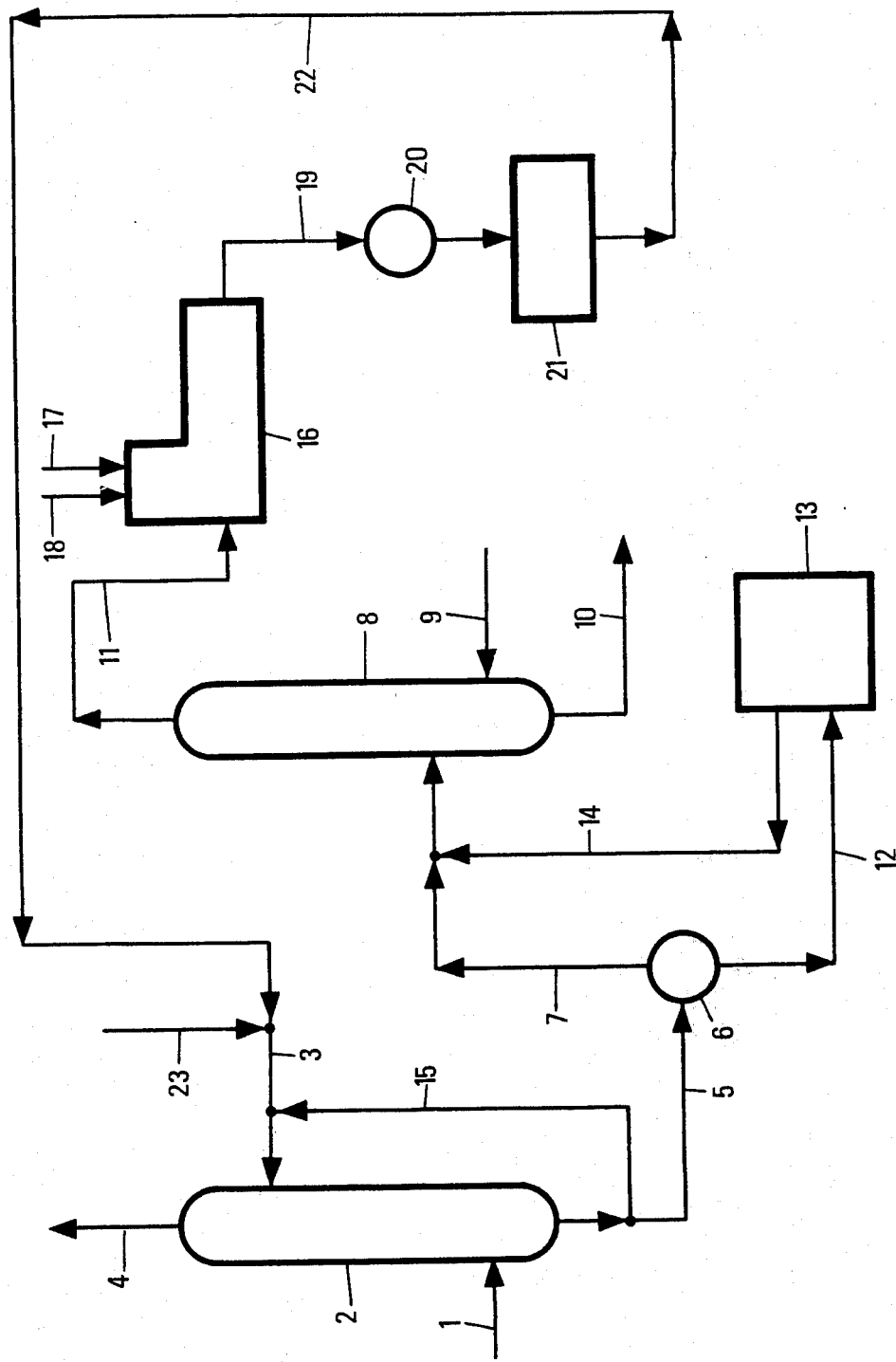

PROCESS FOR PURIFYING A SULFUR DIOXIDE CONTAINING GAS

Many industrial gases, for example stack-gas from power plants, are known to contain sulfur dioxide; their discharge to the atmosphere generates pollution which cannot be prevented at low cost. Sulfur trioxide is also often present, although in relatively lower proportion. it is however essential to eliminate these two gases, in order to reduce the sulfur content of industrial waste-gases to acceptable values.

According to a known purification process, the $SO_2$ and $SO_3$ contents of industrial waste-gases can be reduced by converting them to sulfur, which is non-polluting, easily storable and marketable. This applies particularly to stack-gas from power plants and certain waste-gases from chemical works.

This process comprises the following steps:

a. The sulfur dioxide-containing gas is washed with an aqueous ammonia and/or ammonium sulfite solution, thereby dissolving sulfur dioxide as an aqueous solution of ammonium sulfite and/or bisulfite. The washing temperature is usually from 0° C to 100° C.

b. The resulting solution is heated, thereby decomposing the sulfites and producing a stream of gas containing $SO_2$, $NH_3$ and steam. In this step, the temperature is normally from 100° to 180° C.

c. - Hydrogen sulfide is reacted with the gas stream from step (b), thereby producing elemental sulfur and a stream of gas containing ammonia, steam and a low amount of unconverted hydrogen sulfide; sulfur is then separated from the gas stream. The temperature is usually from 100 to 200° C.

d. The gas stream from the third step, either as such or in the condensed state, is fed back to step (a), and supplies ammonia for this step.

Ammonium sulfate is normally present in the ammonium sulfite and/or bisulfite solution recovered from step (a). The sulfate results either from absorption by ammonia of $SO_3$ contained in the waste-gas or from oxidation of the ammonium sulfites while washing the waste-gas. The liquors recovered from this washing step usually contain from 3 to 15% by weight of ammonium sulfate based on the weight of the ammonium sulfites recovered from sulfur dioxide of the waste-gas.

Ammonium sulfate, when present in the solution obtained at the end of step (a), is also present at the end of step (b), for example in the form of aqueous solution, since it not substantially decomposed in step (b).

Ammonium sulfate as obtained at the end of step (b), or an aqueous solution thereof, may be discharged from the plant; it is however preferably heated with a reducing agent (step e), thereby yielding sulfur dioxide and ammonia which can be joined to the gas stream from step (b).

The recycled ammonia stream of step (d) unavoidably carries small amounts of sulfur compounds, mainly hydrogen sulfide, which results in the formation of undesirable sulfur compounds, such as ammonium thiosulfate and/or ammonium polythionate, in the solution recovered from step (a).

The amount of these compounds depends on the amount of hydrogen sulfide present in the effluent gas from step (c). The theoretical proportions for producing sulfur in that step are in a molar ratio of $H_2S$ to $SO_2$ of 2 : 1. However, as a rule, the operation is conducted at a ratio from about 2.05 : 1 to 2.2 : 1, so as to avoid the formation of ammonium salts in the reactor where the reaction takes place. When operating with the above ratio, the effluent gas from the reactor contains substantial amounts of hydrogen sulfide which are recycled to step (a) either as such or as sulfides in the solution from step (d), thereby yielding the said undesirable compounds during the absorption step (a).

In particular, beyond a 10 % excess over the stoichiometrical amount, i.e. for a $H_2S/SO_2$ ratio of at least 2.2 : 1, the composition of the solution discharged from step (a) is such that very little $SO_2$ can evolve in step (b); since, during vaporization, the ammonium salts suffer transformations detrimental to the only vaporizable compounds, i.e. the sulfites.

The almost entire $SO_2$ amount required for the reaction of step (c) is thus supplied during step (e) initially provided for treating 3 to 15% of ammonium sulfate normally present with the sulfites; the reactor provided for said step (e) is no longer sufficient to decompose all the salts discharged from step (b).

To obviate this defect, a larger sulfate reduction reactor can be employed, but this involves technological difficulties and higher costs of operation.

Another procedure, according to the invention, consists of avoiding the presence of hydrogen sulfide or sulfides in the ammonia solution recycled as absorbing solution for step (a).

Accordingly there is performed a controlled oxidation of the gaseous effluent from the reactor of step (c), thereby removing therefrom $H_2S$ and sulfur, while preventing the formation of nitrogen oxides and of substantial amounts of sulfur trioxide. The oxidation agent is molecular oxygen, for example air.

Although the oxidation of hydrogen sulfide to sulfur dioxide is a known reaction, it is quite unexpected that it can be used in the present case. As a matter of fact, it is a somewhat severe reaction conducted at high temperatures, at which ammonia oxidizes easily to nitrogen and nitrogen oxides, thereby resulting not only in a substantial loss of ammonia but also in the formation of highly polluting compounds discharged to the atmosphere.

Furthermore the presence of hydrogen sulfide increases the degradation rate of ammonia at high temperatures. It has been found that, when conducting the controlled oxidation with a ratio of air to the oxidizable gas of about 15%, the proportion of ammonia degraded in the absence (1) or in the presence (2) of hydrogen sulfide, varies with the temperature as follows:

| TEMPERATURE ° C | % NH$_3$ degraded | |
| --- | --- | --- |
|  | (1) | (2) |
| 650 | — | <1 |
| 700 | — | 4 |
| 750 | 1 | 8 |
| 800 | 5 | 13 |
| 850 | 9 | 18 |

| | The molar composition of the gas was: | | | | |
| --- | --- | --- | --- | --- | --- |
| | N$_2$ | CO$_2$ | NH$_3$ | H$_2$S | H$_2$O |
| (1) | 74 | 6 | 0 | 0 | 10 |
| (2) | 70 | 6 | 10 | 4 | 10 |

It has thus been found that the oxidation of hydrogen sulfide to sulfur dioxide, in the presence of ammonia, can take place without any detrimental degradation or oxidation of ammonia, provided the following critical conditions are complied with: temperature from 400 to 650° C, molar ratio of $H_2S$ to $NH_3$ of at most 0.5/1, preferably from 0.005/1 to 0.1/1 and molar ratio of $O_2$ to $H_2S$ from 1.5/1 to 6/1.

The invention may also be performed by catalytic oxidation of the gaseous effluent discharged from the reactor of step (c), thereby removing therefrom hydrogen sulfide and sulfur at a lower temperature than in a purely thermal controlled oxidation.

In that case, the gaseous effluent from step (c) is passed with air in excess through a converter containing a catalyst comprising a carrier, usually silica, alumina-silica or preferably alumina, and active elements, at a temperature of from 150° to 450° C, preferably 250° to 450° C. The active elements include any element useful for oxidizing hydrogen sulfide, particularly metal oxides, such as vanadium oxide, iron oxide, or a metal such as silver. The amount of active elements is usually from 1 to 20% by weight, preferably 4 to 15%, as concerns the metal oxides, and 0.01 to 5% by weight, preferably 0.05 to 1%, for silver. These elements may be deposited on, for example, an alumina carrier of large surface, or admixed with the carrier, and employed as extrudates, tablets or balls.

The catalysts are employed at a VVH (volume of gas per volume of catalyst per hour) of from 1000 to 15000, usually 2500 to 5000.

When employed at the above mentioned temperatures, the catalysts convert the entire amount of hydrogen sulfide or sulfur contained in the gas discharged from step (c), under the same conditions as for the controlled oxidation, and any detrimental degradation or oxidation of ammonia is also avoided.

The gaseous effluent from the controlled oxidation or from the catalytic oxidation contains essentially sulfur dioxide, ammonia and water and may be recycled as such or after condensation to regenerate the absorption solution of step (a). Ammonium carbonate, formed in the solutions from carbon dioxide present in the inert gas introduced therein, liberates ammonium during the absorption step to combine with sulfur dioxide.

The waste-gas which is discharged to the atmosphere after such purification contains sulfur dioxide in an amount lower than 500 ppm; it is freed of any sulfur trioxide present initially.

A preferred embodiment of the process is described thereafter by way of example.

In a first step, an impure gas containing sulfur dioxide and optionally sulfur trioxide is contacted with an aqueous absorption solution at a temperature from 0° to 100° C, preferably from 40°to 60° C.

The aqueous absorption solution contains ammonia and/or ammonium sulfite. The impure gas, after purification, is discharged with a reduced $SO_2$ and $SO_3$ content; the solution has a higher content of $SO_2$ and $SO_3$ in the form of ammonium sulfites and ammonium sulfate, in aqueous solution.

During the second step (b) of the process, the solution recovered from step (a) is heated to about 100° - 180° C, when operating under atmospheric pressure, in order to vaporize water and decompose at least the major part of the sulfites. When operating at a different pressure, the temperature is modified accordingly.

There are thus collected a gas phase containing mainly $SO_2$, $NH_3$ and $H_2O$ and a liquid phase containing ammonium sulfate and possibly some ammonium sulfite. This phase may contain substantial proportion of water.

When reducing the sulfates in the further step (e), the liquid phase from step (b) is further heated, for example at 180° - 400° C, preferably 250° - 380° C, and reacted at this temperature with a reducing agent, preferably selected from the group of sulfur, hydrogen sulfide and ammonium thiosulfate. The reactions are as follows:

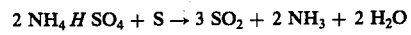

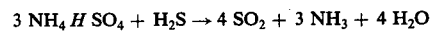

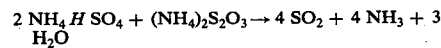

Other reducing agents are, for example, coal, coke, carbon monoxide and hydrogen.

One or more of the reactants may be used in excess, if desired.

The residue of this step, if any, comprises essentially ashes and may be rejected.

In step (c), the gas phase containing water, sulfur dioxide and ammonia, as recovered from step (b) and possibly from step (e), is treated with hydrogen sulfide at a temperature of 100 – 200° C, preferably 115 – 170° C. The reaction is as follows:

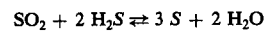

This reaction is preferably conducted in an organic solvent, usually a polyethylene glycol solvent which is particularly stable at the prevailing temperature. The invention is not limited to the use of a particular solvent, and any liquid reaction medium known for this reaction and substantially non reactive with respect to $NH_3$, $SO_2$ and $H_2S$ may be used.

Ammonia does not normally react, but is a catalyst of the above reaction.

The products are respectively sulfur and an effluent gas containing $NH_3$, steam and uncoverted hydrogen sulfide in low amount.

This gas comprises $H_2S$ and $NH_3$ in a molar ratio of at most 0.5 : 1; it is admixed with a molecular oxygen containing gas, for example air, and the resulting mixture is heated to 400 – 650° C. The molar ratio of free oxygen to $H_2S$ is from 1.5 : 1 to 6 : 1, as stated above.

The resulting gas, or the product obtained by cooling or condensation thereof, is recycled to step (a) of the process.

An easy way to supply heat is burning a combustible material, for example one or more hydrocarbons, in the $H_2S$ oxidation zone. In that case, the amount of oxygen is such that the molar ratio of the amount of unconsumed oxygen to the amount of $H_2S$ remains in the range of from 1.5 : 1 to 6 : 1.

The invention is non-limitatively illustrated by the accompanying drawing.

The gas to be purified contains $SO_2$ and a low proportion of $SO_3$. It is conveyed through pipe 1 to the washing column 2, while the aqueous absorption solution enters through line 3. The purified gas is discharged through line 4. It may be subjected to additional washing, in order to recover any ammonia carried along therewith, for example a washing with a solution of sulfuric acid or ammonium hydrogen sulfate; the latter solution may be fed back to one of the units of the plant. The absorption solution may be recirculated through line 15. At least a portion of the aqueous ammonium sulfite solution is conveyed through pipe 5 to the vaporizer 6. The vaporized phase is passed through pipe 7 and delivered to the reactor 8 also fed with $H_2S$ delivered through pipe 9. This reactor preferably contains an organic liquid, for example polyethylene glycol. Sulfur as formed is discharged through line 10.

The unvaporized liquid phase from 6 is passed through line 12 to the reactor 13 where ammonium sulfate reacts with a reducing agent, for example ammonium thiosulfate, hydrogen sulfide and/or sulfur. The resulting gas is supplied to column 8 through pipe 14. The gas discharged from the reactor 8 through line 11 contains $NH_3$, $H_2O$, traces of $SO_2$ and $H_2S$ which has been used in excess over the stoichiometrical amount necessary to form sulfur. This gas is supplied to an incinerator 16 also fed with a gas containing hydrocarbons and air (pipes 17 and 18); it is discharged through line 19, passes through the cooler 20 and the condenser 21. The condensate is conveyed to line 3 through line 22. An additional amount may be supplied through line 23 to compensate for possible losses.

EXAMPLE 1

A flue gas containing $SO_2$ is washed at 50° C with an ammoniacal solution whose molar composition is:

| | |
|---|---|
| $(NH_4)_2 SO_3$ | 1.52 % |
| $(NH_4)_2 CO_3$ | 1.63 % |
| $NH_4OH$ | 3.65 % |
| $H_2O$ | 93.20 % |

The flue gas discharged after a further washing with water has an $SO_2$ content lower than 200 ppm. This washing provides 0.97 kg per hour of brine whose molar composition is:

| | |
|---|---|
| $NH_4 H SO_3$ | 7.9 % |
| $(NH_4)_2 SO_3$ | 4.65 % |
| $(NH_4)_2 SO_4$ | 1.70 % |
| $H_2O$ | 85.75 % |

The solution is heated to 140° – 160° C in a vaporizer: the sulfites are decomposed to a gas containing by mole 8.8% $SO_2$, 12.1% $NH_3$ and water. The remainder of the solution is supplied to a reactor containing ammonium sulfates maintained at 350° C; 6 g of liquid sulfur per hour is added and there is produced a gas containing $SO_2$ and $NH_3$, which is added to that produced in the vaporizer.

The resulting effluent gas is supplied to a reactor containing polyethylene glycol 400 at a temperature of about 140° C; 0.22 m³ of $H_2S$ per hour is added. Sulfur forms and is discharged. 2 m³ per hour of an effluent gas with the following molar composition also evolves:

| | |
|---|---|
| SO | 0.14 % |
| $H_2S$ | 0.83 % |
| $H_2O$ | 72.05 % |
| $NH_3$ | 7.32 % |
| $CO_2$ | 4.55 % |
| $N_2$ | 14.20 % |
| CO | 0.51 % |
| $H_2$ | 0.24 % |
| $S_1$ | 0.16 % |

The carbon oxides and hydrogen have been discharged from the reactor where the sulfates are reduced by sulfur; this reactor is heated with a methane burner arranged inside the reactor.

It is delivered to a thermal incinerator also fed with 0.014 m³ per hour of a gas containing by mole:

| | |
|---|---|
| $H_2$ | 14 % |
| $CH_4$ | 60 % |
| $C_2H_6$ | 15 % |

| | |
|---|---|
| inert gas | 11 % | and with 0.460 m³ per hour of air.

The oxidation in the incinerator takes place at 600° C. A gas is collected; it is cooled and condensed, and then reconstitutes the absorption solution whose composition has been given in the example.

- EXAMPLE 2

The experiment is the same as in example 1, except that, at the outlet from the reactor for converting the acid gases to sulfur (step c), the effluent gas is reheated to 200° C and delivered to an incinerator containing 1 liter of alumina, as balls of 3 mm diameter, on which is deposited 5% b.w. of vanadium oxide $V_2O_5$. The incinerator is also fed with air and a combustible gas, as in example 1. The temperature is 350° C and the VVH is 2,500 $h^{-1}$.

The gas discharged from the incinerator contains no more $H_2S$ and nitrogen oxides. It is condensed and provides the absorption solution to be used in the absorption step mentioned in example 1.

- EXAMPLE 3 (comparison)

The experiment of example 1 is repeated, except that the effluent gas discharged from the conversion reactor is not subjected to the incineration step.

This effluent gas (2 m³ per hour) is cooled and then condensed to recover ammonia in liquid phase. The sulfur compounds remaining in the effluent gas appear as ammonium thiosulfate and ammonium sulfide in the ammoniacal brine.

Its molar composition is as follows:

| | |
|---|---|
| $(NH_4)_2 S_2O_3$ | 0.22 % |
| $(NH_4)_2 S$ | 0.14 % |
| $(NH_4)_2 CO_3$ | 2.34 % |
| $NH_4OH$ | 2.65 % |
| $H_2O$ | 93.63 % |

It is obtained in an amount of 1.35 kg per hour.

This effluent is recycled to the absorption step. The absorption of $SO_2$ and $SO_3$ contained in the gas to be purified is carried out with this solution; the brine has the following molar composition at the inlet of the vaporizer:

| | |
|---|---|
| $(NH_4)_2 S_2O_3$ | 0.45 |
| $(NH_4)_2 S_nO_6$ | 0.50 |
| $NH_4 H SO_3$ | 1.15 |
| $(NH_4)_2 SO_3$ | 0.80 |
| $(NH_4)_2 SO_4$ | 0.80 | in addition to water.

When comparing with the above experiment, it appears that the brine contains a substantial amount of ammonium thiosulfate and ammonium polythionates, in addition to ammonium sulfites and ammonium sulfate.

This brine is passed through the vaporizer, where the contact time and the temperature may be selected at will; it may then have the following molar composition:

| | |
|---|---|
| $(NH_4)_2 S_2O_3$ | 0.78 |
| $(NH_4)_2 S_nO_6$ | 0.60 |
| $(NH_4)_2 SO_4$ | 1.45 |

| -continued | |
|---|---|
| H₂O | 20 |

It appears that, in these conditions, the proportion of $SO_2$ and $NH_3$ formed in the vaporizer is quite low and that the amount of unvaporized effluent delivered to the reduction furnace is far greater than in the above examples. The cost of the process is then substantially higher.

What we claim is:

1. In a process for purifying a sulfur dioxide containing gas, which comprises the steps of (a) washing the gas with an aqueous solution of ammonia and/or ammonium sulfite and then separating the gas from the resulting aqueous solution of increased ammonium sulfites content, (b) heating the aqueous solution obtained in step (a) to decompose at least a portion of the sulfites and produce a stream of gas containing sulfur dioxide, ammonia and steam, (c) reacting hydrogen sulfide with the gas stream obtained in step (b), thereby producing elemental sulfur and a gas containing ammonia, steam and unconverted hydrogen sulfide, and separating the elemental sulfur from said gas, and (d) recycling to step (a) the ammonia obtained in step (c), the improvement which comprises subjecting the ammonia-containing gas separated in step (c) to controlled oxidation to selectively convert residual hydrogen sulfide to sulfur dioxide, and conducting step (d) by recycling ammonia and at least one member of the group consisting of sulfur dioxide and ammonium sulfite to step (a).

2. - A process according to claim 1, wherein the controlled oxidation is conducted at 400° – 650° C with a molecular oxygen containing gas.

3. - A process according to claim 1, wherein the controlled oxidation is conducted at 150° – 450° C with a molecular oxygen containing gas, in the presence of a catalyst comprising (a) a carrier and (b) at least one metal or metal oxide.

4. - A process according to claim 3, wherein the catalyst comprises (a) alumina, silica or alumina-silica and (b) a metal or metal oxide selected from the group comprising silver, silver oxide, vanadium oxide and iron oxide.

5. - A process according to claim 4, wherein the catalyst is vanadium oxide deposited on alumina.

6. - A process according to one of claim 1, wherein the molar ratio of $H_2S$ to $SO_2$ in step (c) is from 2/1 to 2.2/1.

7. - A process according to one of claim 1, wherein the molar ratio of $H_2S$ to $SO_2$ in step (c) is from 2.05/1 to 2.2/1.

8. - A process according to one of claim 1, wherein the molar ratio of $H_2S$ to $NH_3$ in the gas formed in step (c) and subjected to controlled oxidation is at most 0.5/1.

9. - A process according to claim 8, wherein the molar ratio of $H_2S$ to $NH_3$ is from 0.005/1 to 0.1/1.

10. - A process according to one of claim 1, wherein the molar ratio of $O_2$ to $H_2S$ is from 1.5/1 to 6/1.

11. - A process according to one of claim 1, wherein the oxidation of the gas obtained in step (c) is carried out in a zone where a hydrocarbon is burnt, the molar proportion of free oxygen, not employed for the combustion, being from 1.5/1 to 6/1.

12. - A process according to one of claim 1, wherein step (a) is conducted at 0° – 100° C, step (b) at 100° – 180° C and step (c) at 100° – 200° C.

13. A process according to one of claim 1, wherein ammonium sulfate is present in the aqueous solution subjected to step (b), the residual aqueous phase from this step is delivered to a zone for converting ammonium sulfate to a gas containing sulfur dioxide and ammonia, and the latter gas is delivered to step (c).

14. A process according to claim 13, wherein the temperature of conversion of ammonium sulfate is 180° – 400° C, and this conversion is carried out by reduction with coal, coke, sulfur, hydrogen sulfide or ammonium thiosulfate.

15. - A process according to one of claim 1, wherein step (c) is conducted in a liquid which is inert with respect to hydrogen sulfide, sulfur dioxide and ammonia.

16. A process according to claim 1, wherein the gas separated in step (c) is subjected to controlled oxidation and recycled in the gaseous state to step (a).

17. A process according to claim 1, wherein the gas separated in step (c) is cooled to obtain an aqueous solution of ammonia and ammonium sulfite and a residual gas; said residual gas is discharged; and said aqueous solution of ammonia and ammonium sulfite is fed back to step (a).

* * * * *